Oct. 30, 1962  G. G. STODDARD  3,060,751
GYRO DRIVE
Filed Jan. 21, 1960  2 Sheets-Sheet 1
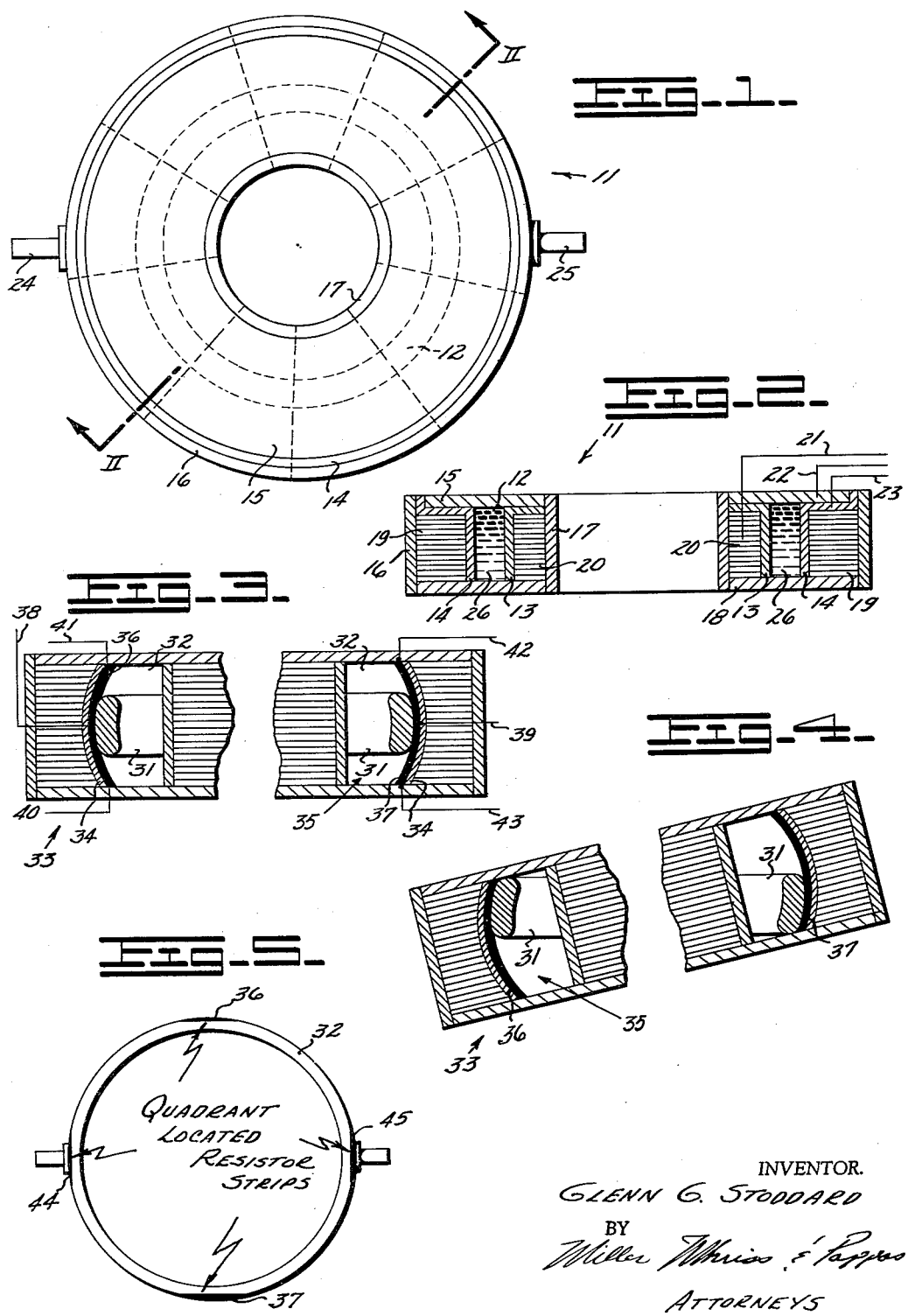
INVENTOR.
GLENN G. STODDARD
BY
ATTORNEYS

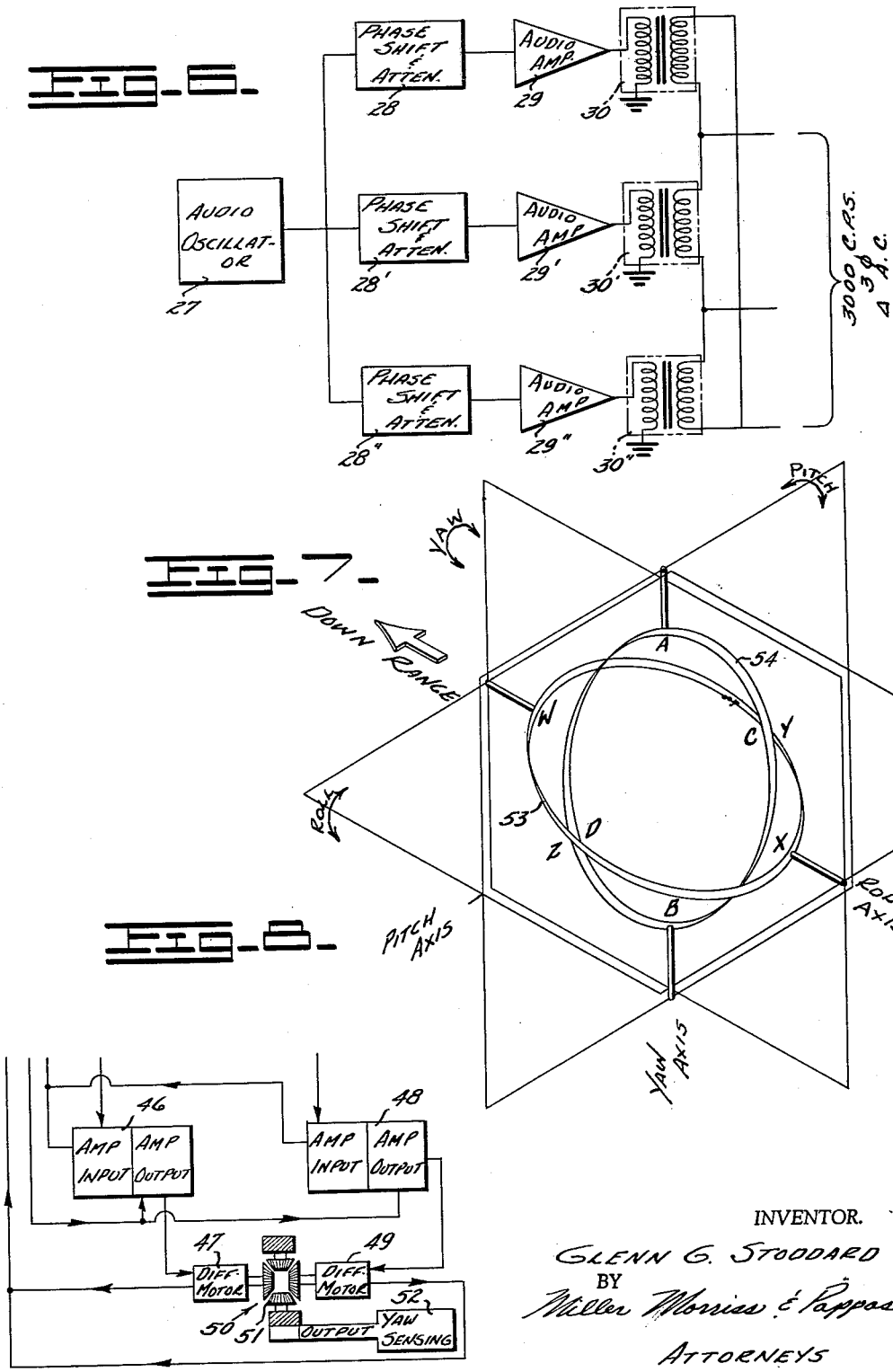

United States Patent Office 3,060,751
Patented Oct. 30, 1962

3,060,751
GYRO DRIVE
Glenn G. Stoddard, West Allis, Wis., assignor of one-half to Ashman C. Stoddard, De Witt, Mich.
Filed Jan. 21, 1960, Ser. No. 3,908
4 Claims. (Cl. 74—5)

The present invention relates to a new and useful drive for gyroscope devices and more particularly to an annular path circumscribing and containing a liquid and wherein fixed means along the annular path propel the liquid to establish a gyroscopic datum plane. More specifically, the present invention relates to an annular closed pathway containing a preferably high specific gravity material propelled in said passage or pathway at high speeds by motor means in fixed relationship about the pathway casing. Thus, the broad object of the present inveniton is to provide a gyroscopic drive and rotor means wherein the mass in motion is liquid and the liquid is wholly enclosed by the non-rotating prime moving structure. The encasement being fixed in relationship to the spinning mass, gimbals are provided as desired in polar positions from the annular encasement. The result is a substantially rotorless drive system wherein the drive analogy is that of a pump acting on the fluid mass and wherein the pumping structure is made a dynamically balanced part of the encasement for the fluid.

The drive of gyroscopic apparatus has always presented difficult problems since the drive means carried into the rotor certain precessional side effects usually attributable to the introduction of electrical power through slip rings or flexible wire connections, and to the effect from mechanical friction which is in turn related to selected bearing fit, lubrication, and the like. This causes the reference plane formed by the whirling mass, whether suspended in fluid or otherwise supported, to "drift" or to deviate from the initial datum plane. Further, rotational speed has been generally considered good at about 36,000 revolutions per minute. To a great extent this represents an optimium as established for example in fly wheels where the centrifugal force expressed as the sum of mass, times radius, times angular velocity, exceeds the limit of the fly wheel material.

This speed is established as an approximate optimum for conventional gyroscopic drive structures considering the structural limits of the rotor and collateral equipment. In general, higher speeds of rotation make possible smaller size and compactness of apparatus since the mass in motion may be reduced and the lever arm or turning radius can be reduced.

As will be appreciated, the above problems are greatly minimized by the structures herein described since the rotating annulus of liquid mass is substantially frictionless in its closed pathway and such drag effects as may be observable at the interphase between casing and fluid occur directly in the plane of rotation thereby avoiding precessional effects normally introduced at the drive axis. The angular momentum is therefore properly conserved and deviating precessional error is avoided. As will be seen, speeds at or beyond 72,000 revolutions per minute are possible wherein the relatively fixed prime mover surrounds the closed annular liquid passage. Since the liquid in motion in the present structure is contained by an outer non-rotating ring, the centrifugal effects on the outer ring portion extends the prior strength limitations where the liquid is rotated as speeds above 32,000 revolutions per minute. As will also be appreciated, the fixing of the drive in the datum plane, established by the rotating liquid mass, substantially reduces construction tolerance criticality in the apparatus thus making possible increase in production without sacrifice of gyroscopic stability. Mechanical error is greatly reduced. At speeds in excess of 32,000 revolutions per minute very good high inertial conditions are obtained.

Persons skilled in the gyroscopic arts will immediately recognize that the presently described structure is amenable to a variety of available "read out" systems such as optic, electronic, mechanical or combinations of these as between the reference plane established by the rotating liquid mass and the structure to which such datum plane is referenced, aircraft, boat, missile, projectile, or the like. It will also be appreciated that new sensing systems are adaptable based upon the presently described structure wherein corrective torque is desired to be applied to the reference vessel to bring such vessel back into reference relation with the datum plane. Such interlocks may be vastly simplified as by resistors immersed in the liquid mass, for example, located in each quadrant. If the case is referenced to the vessel, then by use of simple differential motors a corrective force is applied to restore electrical balance as between polar resistances in control of pitch, roll or yaw. Complete control is accomplished by fixing two structures as herein set forth in planes established at right angles to each other and in gimbal reference to the vessel served. Quite obviously the present gyroscope drive device opens up new areas of miniaturization without sacrifice of instrument accuracy.

While the present structure has greatest utility in gyroscopic instrumentation, it is also contemplated that stabilizing gyroscopes for ships and aircraft can be accordingly redesigned for compactness and greater efficiency.

Among the objects of the present invention is to provide a gyroscopic drive whirling a liquid mass to provide a liquid reference plane.

Another object is to provide a gyroscopic drive free from substantial deviation effects.

Still another object is to provide a drive structure wherein an annular closed path is established for liquid flow and wherein the power source for driving said liquid is located in the encasement structure.

Still another object is the provision of a gyro drive structure for containing a whirling liquid mass and extending the material limitations so as to permit speeds in excess of conventional gyro speeds.

Still another object is to provide a gyroscopic drive utilizing electromagnetic or eddy type liquid motors to achieve maximum rotational speeds in a liquid annular path.

Another object is to provide a liquid drive making possible a unique sensing system using differential motor control wherein liquid gyroscopic limits provide the control coupling.

Other objects include simplification in gyroscopic apparatus along with the newly available compactness resulting from the adoption of the instant drive, along with substantial reduction in dimensional criticality.

Other objects will be readily appreciated by those familiar with the gyroscopic art as the description proceeds.

General Description

In general, the present invention comprises an annular case in which a liquid (pumpable by an electromagnetic or eddy current motor) such as mercury or liquid sodium is confined. The case thus defines an annular closed planal pathway for recirculation of the liquid. Preferably the liquid is selected for high mass. Pumping means are provided in the case so as to entrain the liquid in its annular pathway. The pumping means is most desirably an eddy type electrical motor, sometimes described as an electromagnetic pump, the parts of which structurally strengthen the annular pathway and substantially circumscribe the annular pathway along with the case so as to remotely act upon the liquid mass in the case without physical engagement. The pump means has no moving parts. Polar gimbals are provided as desired extending from the case and fixed thereto. Introduction of electrical power to the eddy type motor may be through the gimbals to the motor circumscribing the annular case. Conventional slip rings or flexible wires are used efficiently since relative motion between gimbals and their trunnions is relatively slow.

Where it is desired to provide integral sensing from the rotating liquid mass, quadrant positioned resistance strips are provided on the outer concave surface of the liquid pathway. Deviation of the liquid path from its base reference centered position causes imbalance in polar quadrant resistance. This imbalance is amplified and transmitted, for example, to a pair of differentially driven and mounted motors. At equal resistance, the motors provide neutralizing control torque. Their operating speeds cancel each other. At unequal resistance the imbalance in motor speeds is transmitted through the differential to a sensing member so as to provide a measureable corrective torque useable as an instrument read-out or tending directly to correct the position of the referenced case or vessel to the desired datum plane. As will be appreciated, such a control system provides a delicate indication, or directly serves, as though auto-pilot or the like to correct the relative position of the craft or vessel to the original plane of reference. It will be appreciated that by teaming a pair of such planes at right angles to each other a complete corrective sensing of pitch, yaw and roll or combinations of each can be accomplished. The relatively fixed position of the case makes possible vastly simplified electrical contact systems.

In the drawings:

FIGURE 1 is a plan view of the rotor housing of the present invention and indicating a selected gimbal position.

FIGURE 2 is a full section view through the rotor housing and taken on the line II—II of FIGURE 1.

FIGURE 3 is a partial section through a rotor housing as shown in FIGURE 2 and illustrating an annulus of liquid in motion in the pathway defined by the housing or case and also indicating the read-out on quadrant positioned resistance strips.

FIGURE 4 is a partial section through the rotor housing as in FIGURE 3 and showing the annulus of liquid in the housing in shifted relative position as the case is shifted.

FIGURE 5 is a schematic plan view of a pathway established by an annular case and indicating the quadrant positioning of resistor control strips in the annular pathway and showing selected polar gimbal position.

FIGURE 6 is a schematic wiring diagram for power input to the electric fluid drive motor around the annular fluid passageway.

FIGURE 7 is a perspective diagram of control planes established by a pair of connected gyro elements as herein described and indicating craft control operations made possible from sensing of fluid annulus position.

FIGURE 8 is a circuit diagram illustrating control sensing in a single plane through quadrant resistance control of a differential motor arrangement as connected to indicators or correction control means.

*Specific Description*

Referring specifically to FIGURES 1 and 2 the rotor structure comprises an annular case or housing 11 which defines within itself an annular passageway or path 12. The pathway or passage 12 is closed, being bounded by the inner path ring 13 and the outer path ring 14. This outer path ring 14 is flanged to receive the upper closure plate 15 and connects to the outer case ring 16. The inner path ring 13 is also flanged to attach to the upper closure plate 15. An inner case ring 17 is provided and a lower closure plate 18. Outer motor laminates 19 and inner motor laminates 20 buttress or back the path rings 13 and 14. Leads 21, 22 and 23 (three phase) provide suitable electrical leads for energization to the windings (not shown) intermediate laminae 19 and 20. Gimbals 24 and 25 are secured in selected diametral or polar relationship to the case or housing 11. The gimbals 24 and 25 may also be regarded as "trunnions," as expressed herein, referring to a bearing permitting a body to incline freely in any direction but more particularly having reference to the suspension of the structure for free rotation in respect to an associated base, as for example, a craft served by the device and allowing free rotation independent of movement of the craft. The pathway 12 is filled with a fluid electrically conducting material 26, preferably of high specific gravity, such as mercury or liquid sodium. The laminae motor elements and intermediate windings are thus secured in the housing 11 and operate on the fluid material to set it in motion in the closed annular passageway. The motor thus is of the fluid pump type and the moving column of fluid material in the pathway establishes a gyroscopic reference plane. The preferred drive illustrated is of the eddy current or electromagnetic type. These motors consist of an inner and outer laminated ferrous toroid. The laminations are slotted to accommodate three phase motor windings. A nine slot unit is illustrated. The motor operates in a manner suggestive of the synchronous three phase induction motor employing a rotating flux effect. Eddy currents are thereby generated in the non-ferrous gyro liquid such as to accelerate the liquid at high velocity synchronized with the alternating cycle. Such electrical pumping principles are believed well known but are unique in their application to a liquid arranged in a closed circular planar path. The particular motor believed most suitable for such gyroscopic structures at the moment is the type of eddy current motor produced by Trombetta Solenoid Corporation, of Milwaukee, Wisconsin. The laminae 19 and 20 are peripherally arranged about the pathway 12 in segments as indicated in multiples of three in the three phase arrangement. A nine segment motor is shown. As will be appreciated by those familiar with gyroscopic apparatus, this vastly simplifies the lead-in problem inasmuch as the case 11 remains, along with the energized laminae, relatively fixed except as the case 11 position may change on the gimbal axis. The moving column of fluid performs the entire function of establishing the reference plane. As shown in FIGURES 1 and 2 the invention thus extends to the provision of a simple rotorless gyroscope structure utilizing a whirling confined mass of high gravity pumpable material, with the pumping occurring from the relatively fixed encasement. The moving mass of fluid equates as the rotor in conventional gyroscope work.

The power input is graphically illustrated in FIGURE 6 (Vari-Tech Corporation of Grand Rapids, Michigan). An audio oscillator 27 feeds to three attenuators 28, 28' and 28" in parallel which accomplish suitable phase shifting. The thus phased input is fed to suitable audio amplifiers 29, 29', 29", then through coils 30, 30' and 30" to motor leads at about 3,000 cycles per second in three phase form alternating current. The arrangement is somewhat conventional, but serves the eddy type motor, above identified, in producing about 72,000 revolutions per minute in the fluid 26 in the annular pathway 12 of the case 11, using a 9 segment motor as shown. This, in itself, is a signal contribution in the gyroscope art. The significance of utilizing a moving annulus of conducting liquid, such as mercury rotated as described, may be better appreciated by reference to the FIGURES 3, 4, 5 and 7 and 8 showing conductometric response and control established and made possible by the reference plane of liquid 26. In the rotorless structure of FIGURES 1 and 2 the liquid mass 26 substantially completely fills the pathway 12.

In FIGURE 3 a mass of mercury 31 is shown whirling in a pathway 32 as defined by the housing structure 33 generally conforming to the description of FIGURES 1 and 2. As will be appreciated the fluid or liquid mass has been greatly reduced in volume and the outer path ring 34 has been modified to provide a slight concave liquid engaging annular path 35. Centrifugal force hurls the liquid mass 31 against the concave surface 35 so as to normally center the mass 31 as shown in FIGURE 3. As the case or housing 33 is tilted from its axis the fluid path or plane of fluid movement remains substantially as in FIGURE 3, but in reference to the case 33 the relative position is shifted. This permits a conductometric assessment of the change in relative position, as in FIGURE 4 for "read-out" or control of associated correction apparatus. As illustrated in FIGURES 3 and 4 a resistance sensing system is utilized. The resistance material, for example, iron strips 36 and 37 provide a part of the concave path 35 and extend transversely across the path. Probes 38 and 39 extend into the pathway 35 at the center. A known input to the probes 38 and 39 passes through the resistance strips 36 and 37 to the extent that it is not led out to the edge of the path by the mercury to contacts 40 or 41 in strip 36, or 42 or 43 in strip 37. With reference to FIGURE 5, the strips 36 and 37 and companion control strips 44 and 45 are each located in polar sets in quadrant positions as shown. This conductometric response (resistance) thus senses in each quadrant any relative variation between liquid path and case. The normal position of FIGURE 3 results in an equal resistance between the center probes 38 and 39 and outside contacts 40, 41 and 42 and 43 in strips 36 and 37. Deviation from this position, as illustrated in FIGURE 4, for example, results in a differential read-out on strips 36 and 37 since an imbalance in position arises by reason of the relative shift in position. Such deviation from centered position is amplified by considering the precise opposite result in the opposite quadrant (FIGURE 4). These opposite relative positions, in opposed quadrants are useable as an imbalance. This imbalance, as will be appreciated, is utilizeable in read out or control. In FIGURE 8 one function is extracted from an entire control circuit to demonstrate the sensing simplicity. The resistance dominated current is directed to an amplifier 46 where the current is amplified and directed to differential motor 47. In the opposite quadrant a reverse resistance effect is occurring and the resistance dominated current is directed to amplifier 48 where the current is amplified to drive the differential motor 49. The motors 47 and 49 are opposed in each side of a bevel gear differential 50.

The differential gearing 50 provides no drive through bevel gear 51 when the opposing motors are controlled by equal resistance. When imbalance occurs, however, as between the motors 47 and 49, then motion occurs in the bevel gear 51. This motion is utilized to operate correcting means 52, moving the craft back into register with the reference plane established by the moving column of mercury. The craft in shifting carries with it the case 11. It may also be used for operating a mechanical read-out or the like. In FIGURE 7 a pair of planes at right angles to each other are represented as referenced to each other fixedly, the plane of ring 53 being fixed at right angles to the ring 54, both of the rings representing the rotorless liquid passageway of path elements herein described. As will be seen, the illustrated caging involves suspension in control of three axes as in aircraft navigation. Motion on the axis of roll and the axis of yaw is independently sensed by ring 53 and 54, respectively, with the motion in relation to the pitch axis sensed by both ring 53 and ring 54. Sensing, as indicated occurs in the quadrant located polar positioned resistance strips.

In such instances, the pitch sensing is coordinated by electrometric response in rings 53 and 54 and coordinated in a correction structure similar to that illustrated in FIGURE 8, although the FIGURE 8 structure simply shows the yaw control from points C and D of FIGURE 7. This is to simplify the control concept, C and D being differentially affected by a yaw of the craft. Leads from C and D quadrants are illustrated in FIGURE 8 as controlling the sensing equipment. In tabular form the control is represented as follows:

| Control | Differential Control | | Gyro Plane |
|---|---|---|---|
| Yaw | C-D | Ring 53 | (see control Fig. 8.) |
| Roll | Z-Y | Ring 54 | |
| Pitch | W-X, A-B | Ring 54, Ring 53 | |

The letter designations above are shown in FIGURE 7 and relate to the quadrant located resistance strip elements. As will be appreciated, the rings 53 and 54 are fixed in relation to each other defining intersecting planes at right angles to each other. As previously indicated, when the resistance at C equals the reistance at D the case is in full register with the whirling liquid datum plane.

*Operation*

In operation the gyroscopic device of the present invention develops extremely high (72,000 revolutions per minute) speed thereby opening the door to extreme miniaturization in the gyroscope art. Unlike prior developments in gyroscopic drives, the significance of dimensional accuracy occurring in parts is greatly reduced. The fluid is set into motion using devices such as the eddy type or electromagnetic motor integrated in the housing of the device thereby greatly simplifying drive, signal control and mounting. The mass of confined whirling liquid results in a relatively fixed encasement with the rotating fluid serving as the rotating mass to provide a rotorless gyroscope action. The use of a fluid high specific gravity mass diminishes the role of mechanical friction and introduces new concepts of electrometric read-out. Mechanical problems previously encountered in gyroscope use are substantially avoided. It is quite possible that mass production of such devices can greatly reduce cost below that now known in the gyroscope art. Unlike conventional rotors in gyroscopes, the mass is not retained from the center, but is confined at the periphery by the fixed encasement and drive support elements. Lubrication problems are substantially eliminated and low drag coefficients in the liquid mass allows rapid acceleration to operating speeds.

Having thus described my invention, those skilled in the art will immediately perceive improvements and modifications and such improvements and modifications are intended to be included in the spirit of the foregoing invention limited only by the scope of the hereinafter appended claims.

I claim:

1. A gyroscopic drive means comprising: an annular fluid encasement defining a closed annular fluid passageway; motor elements disposed about said passageway and comprising a portion of said encasement; a high specific gravity conducting motor driven fluid in said passageway; conductometric sensing means in said passageway spaced in 90 degree positions thereabout; electrical leads from said sensing means; and an electrical lead to said passageway at the center thereof at the said sensing means, said sensing means and said leads providing an electrometric response to deviation between said encasement and said motor driven fluid.

2. In a gyroscope element the combination comprising: a closed path annular fluid conduit; an eddy type motor element in segment form arranged in annular disposition about said closed fluid conduit; an encasement enclosing said motor and said fluid conduit; polar gimbals extending from said encasement; a high mass liquid in said fluid conduit and rotatable by said motor element; and electrometric sensing means in said conductor indicating the relative position as between the plane of rotating fluid mass and said encasement.

3. The combination as expressed in claim 2 in a structure to be stabilized and including differential electrometric read-out as between opposite quadrants; and means acted upon by said differentially controlled read-out to accomplish a corrective signal for stabilizing the structure served by said gyroscopic device.

4. A gyroscope structure comprising: a case defining an annular closed passageway; motor elements disposed in annular relationship about said case and reinforcing said annular passageway thus defined; a high specific gravity and electrically conductive liquid in said passageway and rotatable therein in cooperation with energization of said motor element; polar gimbals extending from said case and coplanar with said annular passageway; resistance strips in said passageway in contact with said liquid and positioned 90 degrees apart from each other; and read-out means in cooperation with said strips responsive to continuous differential resistance as between strips thereby indicating degree of movement as between said case and said liquid in motion.

References Cited in the file of this patent

UNITED STATES PATENTS

| | | |
|---|---|---|
| 2,949,784 | Maeder | Aug. 23, 1960 |
| 2,953,925 | Yeadon | Sept. 27, 1960 |

FOREIGN PATENTS

| | | |
|---|---|---|
| 1,185,380 | France | Feb. 16, 1959 |